United States Patent [19]

Kitano et al.

[11] 3,864,375
[45] Feb. 4, 1975

[54] THIN-FILM TYPE SULFONATION PROCESS

[75] Inventors: Kyozo Kitano, Ichikawa; Junichi Nakayama, Tokyo; Sadao Toyoda, Funabashi, all of Japan

[73] Assignee: Lion Fat & Oil, Ltd., Tokyo, Japan

[22] Filed: Apr. 20, 1973

[21] Appl. No.: 352,911

[30] Foreign Application Priority Data
Apr. 28, 1972 Japan.................................. 47-42794

[52] U.S. Cl. ............................ 260/459, 260/513 R
[51] Int. Cl..................... C07c 139/00, C07c 143/06
[58] Field of Search............. 260/456 R, 459, 513 R

[56] References Cited
UNITED STATES PATENTS

| | | | |
|---|---|---|---|
| 3,084,176 | 4/1963 | Dieckemam et al............ | 260/456 R |
| 3,350,428 | 10/1967 | Brooks et al..................... | 260/456 R |
| 3,492,239 | 1/1970 | Baumann et al................ | 260/513 R |
| 3,551,460 | 12/1970 | Sowerby........................... | 260/459 R |
| 3,763,208 | 10/1973 | Sowerby........................... | 260/459 R |

*Primary Examiner*—Bernard Helfin
*Assistant Examiner*—Norman P. Morgenstern
*Attorney, Agent, or Firm*—Woodhams, Blanchard and Flynn

[57] ABSTRACT

A process for thin-film type sulfonation of a sulfonatable reactant such as olefins and higher alcohols, which comprises adding a small amount of non-ionic surface active agent to said reactant and effecting sulfonation of said reactant in the presence of said surface active agent.

5 Claims, No Drawings

THIN-FILM TYPE SULFONATION PROCESS

BACKGROUND OF THE INVENTION

For the purpose of sulfonating olefins and higher alcohols usable as the raw material for surface active agents employment of the thin-film type sulfonation process is popular. As is commonly known, this thin-film type sulfonation process is intended to bring an olefin or a higher alcohol in the state of a thin film into contact with diluted $SO_3$ gas. Generally speaking, the sulfonation reaction of an olefin or a higher alcohol with $SO_3$ gas is defective in that, because the reaction speed is too fast and considerable heat is generated, it is difficult to control the reaction appropriately, and as a result, the color tone of the reaction product is very apt to deteriorate. Besides, when the substance to be sulfonated is an olefin, the yield of the intended monosulfonate is decreased due to generation of byproducts such as disulfanates. Such a tendency is present also in the thin-film type sulfonation process. Further, in the case of the thin-film type sulfonation process, there arises a problem that a portion of the product solidifies and adheres to the wall surface along which the thin film of olefin or higher alcohol flows, thereby impairing the cooling effect thereof. Besides, because the flow of the thin film is apt to become wavy, there also arises the trouble that generation of mist by the flow of diluted $SO_3$ gas is inevitable.

The present invention is intended to overcome the foregoing drawbacks of the thin-film type sulfonation process by adding, prior to sulfonation a small amount of a non-ionic surface active agent to the olefin or a higher alcohol to be sulfonated.

SUMMARY OF THE INVENTION

The present invention provides an improved thin-film type sulfonation process which is characterized by incorporating 30 – 10,000 ppm (by weight) of a non-ionic surface active agent in the olefin or higher alcohol prior to sulfonating said olefin or higher alcohol by the thin-film type sulfonation process.

The process according to the present invention makes it possible to control the generation of by-products incident to the thin-film type sulfonation process, to increase the yield of monosulfonate, to remarkably improve the color tone of the reaction products, and to further check the generation of mist. The reason why such excellent effects of the present invention can be brought about may be explained as follows. To begin with, the non-ionic surface active agent employed in the present invention has the effect of slowing down the reaction rate of sulfonation reaction. In other words, when an olefin or a higher alcohol forms a flowing thin film, said non-ionic surface active agent present therein is concentrated centering on the surface of the flowing thin film coming in contact with the diluted $SO_3$ gas — that is, the gas-liquid contact surface — thereby obstructing the contact between the olefin or higher alcohol and $SO_3$ to some extent. As a result, the rate of the sulfonation reaction is somewhat slowed down, and accordingly, an excessive sulfonation seems to be checked. The non-ionic surface active agent according to the present invention also has the effect of decreasing the gas-liquid contact surface area. In other words, according to the conventional thin-film type sulfonation process, the flow of thin film per se becomes a turbulent undulating flow having influence on the gas-liquid contact surface too, and this causes not only the generation of mist but also an excessive sulfonation. While, according to the process according to the present invention, inasmuch as the non-ionic surface active agent works to drastically control the generation of undulating flow of the thin film to thereby decrease the gas-liquid contact surface, the generation of mist is minimized and the flow of thin film is improved to be of uniform thickness so that the cooling effect on said gas-liquid contact surface can be enhanced. Accordingly, the deterioration of the color tone of the products ascribable to excessive sulfonation and the generation of byproducts such as disulfonates can be controlled. Moreover, the non-ionic surface active agent employed in the present invention displays the effect of preventing adhesion of solids on the wall surface along which the thin film flows. Considering that the adhesion of solids on the wall surface constitutes a cause for the generation of extremely pulsatile flow, this effect of preventing adhesion of solids is considered contribute to the prevention of the generation of mist and the control of excessive sulfonation.

The substances illustrative of the non-ionic surface active agent to be incorporated in the olefin or higher alcohol prior to sulfonation according to the process of the present invention, includes adducts of higher alcohol, alkyl phenol, fatty acid, fatty acid amide, etc. to ethylene oxide or propylene oxide; fatty acid diethanol amide; glycerol ester of fatty acid; fatty acid ester of sorbitan, sorbitol or sucrose; etc. The amount of these non-ionic surface active agents to be incorporated in said olefin or higher alcohol is usually in the range of 30 – 10,000 ppm (by weight) — preferably about 50 – 5,000 ppm (by weight) when it is less than 30 ppm, the aforesaid effect of the non-ionic surface active agent will not be displayed sufficiently, while any increase of said effect will be infeasible when it is in excess of 10,000 ppm.

The thin-film type sulfonation process according to the present invention renders it possible to sulfonate olefins having 12 – 22 carbon atoms and higher alcohols having 8 – 22 carbon atoms under substantially the same conditions as those employed in the conventional thin-film type sulfonation process. In this connection, as the conditions for practicing the conventional thin-film type sulfonation process, the following conditions are generally adopted: the concentration of $SO_3$ gas is in the range of about 1 – 8 vol. %, the molar ratio of $SO_3$ (relative to olefin or higher alcohol) is in the range of about 0.8 – 1.30, the reaction temperature in the range of about 30° – 60° C and the length of the flow of thin film is in the range of about 0.5 – 3m. Besides, as to the aftertreatment of the sulfonation reaction product, the process according to the present invention does not differ from the conventional process, and the product can be subjected to such treatments as adjustment of pH and bleaching, as occasion demands, subsequent to neutralization and hydrolysis.

DESCRIPTION OF THE PREFERRED EMBODIMENTS

EXAMPLE 1

Upon adding Span 20 (the trade name of a manufacture of TOKYO KASEI K.K.) as the non-ionic surface active agent to α-olefin having 14 carbon atoms, sulfonation was effected by a thin-film type sulfonation process under the conditions of a in concentration of $SO_3$ gas 4 vol. %, a molar ratio of $SO_3$ (relative to olefin of 1.15) and a reaction temperature of 32° – 50° C. The properties of the sulfonation reaction product in this case were as shown in Table 1 below.

Table 1

| Amount of surface active agent employed (ppm by wt.) | Color tone Transmittancy in 420 mμ (10 mm-cell) of 5% aqueous solution of olefin sulfonate | Unreacted oil content (petroleum ether fraction relative to active salt) (wt.%) | Byproduct disulfonate (based on active salt) (wt.%) |
|---|---|---|---|
| none | 0.090 | 3.3 | 15.0 |
| 30 | 0.050 | 3.1 | 13.0 |
| 50 | 0.045 | 3.1 | 11.0 |
| 100 | 0.040 | 3.0 | 10.3 |
| 500 | 0.035 | 2.9 | 10.2 |
| 1,000 | 0.032 | 2.8 | 10.4 |
| 5,000 | 0.030 | 2.6 | 10.1 |
| 10,000 | 0.030 | 2.7 | 10.6 |

EXAMPLE 2

Except for substituting the adduct of 3 mols of ethylene oxide to lauryl alcohol for the non-ionic surface active agent, the same thin-film sulfonation process as in Example 1 was performed. The properties of the sulfonation reaction product in this case were as shown in Table 2 below.

Table 2

| Amount of surface active agent employed (ppm by wt.) | Color tone Transmittancy in 420 mμ (10 mm-cell) of 5% aqueous solution of olefin sulfonate | Unreacted oil content (petroleum ether fraction relative to active salt) (wt.%) | Byproduct disulfonate (based on) active salt) (wt.%) |
|---|---|---|---|
| none | 0.090 | 3.3 | 15.0 |
| 30 | 0.045 | 3.0 | 12.0 |
| 50 | 0.040 | 2.9 | 11.0 |
| 100 | 0.035 | 2.9 | 10.2 |
| 500 | 0.030 | 2.8 | 10.0 |
| 1,000 | 0.027 | 2.6 | 9.9 |
| 5,000 | 0.025 | 2.7 | 10.2 |
| 10,000 | 0.027 | 2.5 | 10.2 |

EXAMPLE 3

Upon adding the adduct of 8 mols of ethylene oxide to nonyl phenol to a synthetic alcohol having 12 – 18 carbon atoms, the thin-film type sulfonation process was performed under the same conditions as those in Example 1. The properties of the sulfonation reaction product in this case were as shown in Table 3 below.

Table 3

| Amount of surface active agent employed (ppm by wt.) | Color tone (Transmittancy in accordance with Tables 1 & 2) | Unreacted oil content (petroleum ether extraction based on active salt) (wt.%) |
|---|---|---|
| none | 0.068 | 3.6 |
| 30 | 0.047 | 3.4 |
| 50 | 0.045 | 3.3 |
| 100 | 0.045 | 3.3 |
| 500 | 0.042 | 3.2 |
| 1,000 | 0.042 | 3.1 |
| 5,000 | 0.040 | 3.3 |
| 10,000 | 0.040 | 3.2 |

What is claimed is:

1. In a process for effecting the thin film sulfonation of organic sulfonateable material, in which a feed stream of organic material is flowed in the form of a thin film along a reaction surface having a length of about 0.5 to 3 meters, and is contacted with a gaseous stream of $SO_3$ and inert gas wherein the $SO_3$ concentration is in the range of about 1 to 8 vol. %, and the reaction temperature is in the range of about 30° to 60° C, the improvement which comprises:

employing as the feedstream a mixture consisting essentially of (1) a sulfonatable material selected from the group consisting of olefins having 12 to 22 carbon atoms and fatty alcohols having 8 to 22 carbon atoms, and (2) from 30 to 10,000 ppm by weight, based on the weight of (1), of a non-ionic surface active agent selected from the group consisting of (a) ethylene oxide or propylene oxide adducts of higher fatty alcohols, alkylphenols, fatty acids and fatty acid amides, (b) fatty acids diethanolamides and (c) fatty acid esters of glycerol, sorbitan, sorbitol and sucrose.

2. An improved process according to claim 1, in which said non-ionic surface active agent is added to said reactant in an amount of from 50 to 5,000 ppm.

3. A process according to claim 1, in which (1) is a C14 α-olefin and (2) is a fatty acid ester of sorbitan.

4. A process according to claim 1, in which (1) is a C14 α-olefin and (2) is an adduct of 3 mols of ethylene oxide to lauryl alcohol.

5. A process according to claim 1, in which (1) is an alcohol having 12 to 18 carbon atoms and (2) is an adduct of 8 mols of ethylene oxide to nonyl phenol.

* * * * *